(12) United States Patent
Inoue

(10) Patent No.: US 10,008,060 B2
(45) Date of Patent: Jun. 26, 2018

(54) SMART ENTRY SYSTEM

(71) Applicant: DENSO CORPORATION, Kariya, Aichi-pref. (JP)

(72) Inventor: Hiroki Inoue, Seto (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 14/773,062

(22) PCT Filed: Mar. 3, 2014

(86) PCT No.: PCT/JP2014/001153
§ 371 (c)(1),
(2) Date: Sep. 4, 2015

(87) PCT Pub. No.: WO2014/136428
PCT Pub. Date: Sep. 12, 2014

(65) Prior Publication Data
US 2016/0005250 A1    Jan. 7, 2016

(30) Foreign Application Priority Data

Mar. 7, 2013  (JP) ................ 2013-045123

(51) Int. Cl.
*G07C 9/00* (2006.01)
*B60R 25/24* (2013.01)
(Continued)

(52) U.S. Cl.
CPC ........ *G07C 9/00174* (2013.01); *B60R 25/209* (2013.01); *B60R 25/24* (2013.01);
(Continued)

(58) Field of Classification Search
CPC ...... G07C 9/00309; G07C 2009/00793; G07C 9/00007; G07C 9/00111; G07C 9/00158;
(Continued)

(56) References Cited

U.S. PATENT DOCUMENTS

2006/0290466 A1* 12/2006 Kamiya ............ G07C 9/00309
340/5.6
2007/0120644 A1   5/2007 Seike
(Continued)

FOREIGN PATENT DOCUMENTS

| JP | 2001341595 A | 12/2001 |
| JP | 2005031869 A | 2/2005 |

(Continued)

OTHER PUBLICATIONS

International Search Report and Written Opinion (in Japanese with English Translation) for PCT/JP2014/001153, dated Apr. 28, 2014; ISA/JP.

*Primary Examiner* — Anne M Antonucci
*Assistant Examiner* — Sanjeev Malhotra
(74) *Attorney, Agent, or Firm* — Harness, Dickey & Pierce, P.L.C.

(57) ABSTRACT

A smart system locks a door of a vehicle when there is a user's instruction to lock the door when a first portable device in which first identification information is stored is outside the vehicle and a second portable device in which second identification information is stored is inside the vehicle, and controls the power supply state from a normal state to a power supply continuation state in which power continues to be supplied only to a predetermined power supply continuation device in the vehicle.

15 Claims, 4 Drawing Sheets

(51) Int. Cl.
*B60R 25/20* (2013.01)
*E05B 47/00* (2006.01)

(52) U.S. Cl.
CPC .......... *B60R 25/243* (2013.01); *B60R 25/245* (2013.01); *E05B 47/0001* (2013.01); *G07C 9/00309* (2013.01); *E05B 2047/0048* (2013.01); *E05B 2047/0072* (2013.01); *E05B 2047/0084* (2013.01); *E05B 2047/0097* (2013.01); *G07C 2209/63* (2013.01)

(58) Field of Classification Search
CPC ............ G07C 9/00817; G07C 9/00944; B60R 25/24; B60L 11/1846; B60L 2240/80; Y02T 10/7005; Y02T 90/121; Y02T 90/128; Y02T 90/14; Y02T 90/163; Y02T 90/169; Y04S 30/14; B60W 2510/244
USPC ....... 701/2, 22; 340/5.7, 5.72, 988; 320/109; 455/41.2, 456.1
See application file for complete search history.

(56) References Cited

U.S. PATENT DOCUMENTS

| | | | | |
|---|---|---|---|---|
| 2008/0074234 | A1* | 3/2008 | Nelson | B60R 25/04 340/5.2 |
| 2008/0157919 | A1 | 7/2008 | Sugiura et al. | |
| 2008/0204281 | A1* | 8/2008 | Sugiura | B60R 25/24 340/988 |
| 2008/0262662 | A1* | 10/2008 | Higashi | B60R 25/209 701/2 |
| 2009/0058597 | A1* | 3/2009 | Shibagaki | B60R 25/24 340/5.72 |
| 2009/0096573 | A1* | 4/2009 | Graessley | H04W 12/04 340/5.8 |
| 2009/0096575 | A1* | 4/2009 | Tieman | G07C 9/00309 340/5.62 |
| 2010/0071427 | A1* | 3/2010 | Tsuruta | B60R 25/241 70/237 |
| 2010/0073130 | A1* | 3/2010 | Tsuruta | B60R 25/24 340/5.8 |
| 2010/0283579 | A1* | 11/2010 | Kraus | G07C 9/00944 340/5.7 |
| 2010/0320966 | A1* | 12/2010 | Baxter | B60L 11/1816 320/109 |
| 2011/0022256 | A1* | 1/2011 | Asada | B60L 11/1824 701/22 |
| 2011/0153118 | A1* | 6/2011 | Lim | H04M 1/72533 701/2 |
| 2012/0310447 | A1* | 12/2012 | Toki | B60R 25/24 701/2 |
| 2014/0106780 | A1* | 4/2014 | Keinanen | H04M 1/7253 455/456.1 |
| 2014/0113565 | A1* | 4/2014 | Muramatsu | H04W 4/008 455/41.2 |

FOREIGN PATENT DOCUMENTS

| | | | |
|---|---|---|---|
| JP | 2007076415 A | 3/2007 | |
| JP | 2007146415 A | 6/2007 | |
| JP | 2007254962 A | 10/2007 | |
| JP | 2008163633 A | 7/2008 | |
| JP | 2008213514 A | 9/2008 | |
| JP | 2009262856 A | 11/2009 | |
| JP | 2010168009 A | 8/2010 | |
| JP | 2015101914 A | * 6/2015 | ......... G07C 9/00309 |

\* cited by examiner

SMART ENTRY SYSTEM

CROSS REFERENCE TO RELATED APPLICATIONS

This application is a U.S. National Phase Application under 35 U.S.C. 371 of International Application No. PCT/JP2014/001153 filed on Mar. 3, 2014 and published in Japanese as WO 2014/136428 A1 on Sep. 12, 2014. This application is based on and claims the benefit of priority from Japanese Patent Application No. 2013-045123 filed on Mar. 7, 2013. The entire disclosures of all of the above applications are incorporated herein by reference.

TECHNICAL FIELD

This disclosure relates to a smart entry system.

BACKGROUND ART

There is widespread use of vehicles equipped with a smart entry system (also referred to as a keyless entry system) that detects approach of a user (such as a driver) to a vehicle and implements a function predetermined for the vehicle. When the driver approaches the vehicle, the smart entry system automatically exchanges a signal between a portable device carried by the driver and an in-vehicle device mounted on the vehicle and verifies that the portable device belongs to the vehicle. Based on a verification result, the smart entry system can unlock a vehicle door or activate an engine.

The smart entry system allows each of occupants in the vehicle to carry a portable device. The smart entry system can generate an alarm when an occupant gets off the vehicle and locks the door while his or her portable device is left in the vehicle compartment.

A vehicle and a system configuration according to the prior art can continue to supply the power to an in-vehicle device when an engine activation state continues and an ignition switch remains turned on. Some vehicles or systems disable a door from being locked in order to be accessible to a portable device that is left in the vehicle compartment. This enables the vehicle to travel and is unfavorable for security.

As described in Patent Literature 1, suppose that several portable devices remain in a vehicle compartment and one of the portable devices is carried by a system administrator. The smart entry system detects that one of the portable devices except the one carried by the system administrator is moved out of the vehicle compartment and then performs a process to issue an alarm to users including at least the system administrator in the vehicle. The system can issue an alarm when a child as a fellow passenger of his or her parent carelessly attempts to open a door. There may be a case where the system administrator (such as a driver) leaves the vehicle and another user (such as a child) manipulates a driving device such as a steering wheel or an ignition key. In this case, an alarm is automatically issued to the system administrator or other users. This can prevent a user such as a child from mischievously manipulating the vehicle.

As described in Patent Literature 2, suppose that a main switch (such as an ignition switch) controls a battery to supply a low ignition voltage. To solve this, the power controller includes the control unit that saves various setting information and data in flash memory and turns off the power controller.

PRIOR ART LITERATURES

Patent Literature

Patent Literature 1: JP-2007-146415 A
Patent Literature 2: JP-2001-341595 A

SUMMARY OF INVENTION

A fellow passenger such as a child may want to continue enjoying a TV program or a tune when he or she needs to leave the vehicle. However, a driver may want to leave the vehicle as soon as possible (or to reach a destination as early as possible). In such a case, the configuration described in Patent Literature 1 contradicts requests of both and cannot satisfy the requests.

According to the configuration described in Patent Literature 2, a decrease in the ignition voltage stops an air-conditioner when operated. This disables adjustment of the interior temperature and degrades the interior environment. Especially in summer, the temperature in the vehicle compartment may rise to degrade the comfort.

It is an object of the present disclosure to provide a smart entry system capable of locking a vehicle even when a portable device is left in a vehicle compartment.

A smart entry system according to an aspect of the disclosure includes: a portable device carried by a user; and an in-vehicle device mounted on a vehicle. The portable device includes: a first portable device that stores first identification information to identify the first portable device itself; and a second portable device that stores second identification information to identify the second portable device itself. The in-vehicle device includes: a verification unit that verifies whether the portable device is outside or inside a compartment of a vehicle and detects the portable device as a verification object; a portable device detection unit that detects the portable device based on a verification result from the verification unit; a lock instruction detection unit that detects a lock instruction entered by the user to lock a door of the vehicle; a control unit that locks the door and changes a state of supplying power to the vehicle from a normal state to a power supply continuation state that continues supplying power to only a predetermined power supply continuation device of the vehicle when the lock instruction detection unit detects the lock instruction and when the portable device detection unit detects the first portable device outside the compartment of the vehicle and detects the second portable device inside the compartment of the vehicle; and a state information output unit that outputs state information that reflects the power supply continuation state.

According to the aspect of the disclosure, a driver carries a main key (first portable device) and locks a vehicle door when he or she gets out of the vehicle while confirming security and safety. A fellow passenger such as a child is controlled to carry an auxiliary key (second portable device) and can stay in a vehicle compartment. The power can be continuously supplied to only an audio-related device. The fellow passenger can continue enjoying a TV program or a song until he or she gets out of the vehicle.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
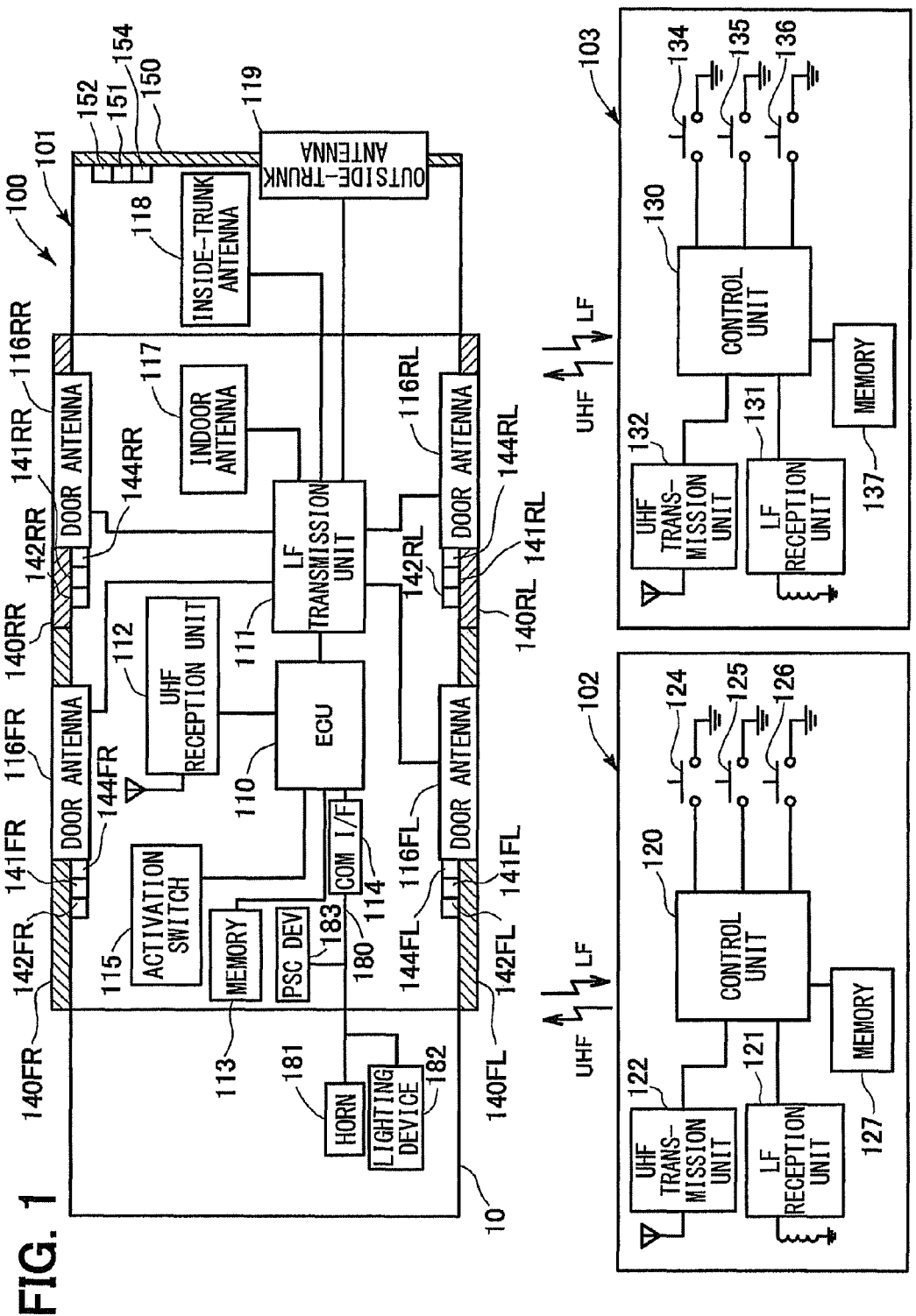
FIG. 1 is a block diagram illustrating a configuration of a smart entry system according to an embodiment of the disclosure.

The smart entry system according to the embodiment of the disclosure will be described with reference to accompanying drawings. As illustrated in FIG. 1, a smart entry system 100 includes an in-vehicle device 101 mounted in a vehicle 10, a main key 102 (corresponding to a portable device or a first portable device according to the disclosure) carried by a user, and an auxiliary key 103 (corresponding to a portable device or a second portable device according to the disclosure).

The in-vehicle device 101 includes an ECU 110 connecting with an LF transmission unit 111, a UHF reception unit 112, a memory 113 such as flash memory as a nonvolatile storage medium, a communication I/F 114, and an activation switch 115. The LF transmission unit 111 connects with a door antenna 116 (a generic term for 116FR, 116FL, 116RR, and 116RL), an indoor antenna 117, an inside-trunk antenna 118, and an outside-trunk antenna 119.

The ECU 110 (corresponding to a verification unit, a portable device detection unit, a lock instruction detection unit, and a control unit according to the disclosure) represents a computer including a known CPU, ROM and RAM to store various programs (generically termed an in-vehicle device control program), and a signal input/output circuit that are not shown in the drawings. The CPU performs the in-vehicle device control program to implement various functions as the in-vehicle device 101.

In response to operation of the main key 102 and the auxiliary key 103, the LF transmission unit 111 transmits a radio signal using an LF-band or VLF-band radio wave. A radio signal transmitted from the LF transmission unit 111 reaches only limited communication areas near the door (outside the vehicle compartment), inside the vehicle compartment, inside the trunk, and near the outside of the trunk via a door antenna 116 attached to a door 140 (a generic term for 140FR, 140FL, 140RR, and 140RL to be described later), an indoor antenna 117, an inside-trunk antenna 118, and an outside-trunk antenna 119, respectively.

The UHF reception unit 112 (corresponding to a portable device detection unit, a lock instruction detection unit, and a control instruction acquisition unit according to the disclosure) receives a radio signal transmitted from the main key 102 and the auxiliary key 103 using a UHF-band radio wave, for example. This enables to ensure a reasonable communication distance and reliably transmit a response signal to the in-vehicle device 101 even when the main key 102 and the auxiliary key 103 indicate a relatively weak output level.

The communication I/F 114 (corresponding to a state information output unit, a battery state acquisition unit, and a notification unit according to the disclosure) provides an interface circuit that enables data communication with other devices using an in-vehicle LAN 180.

A user uses the activation switch 115 to activate a prime mover including at least one of an engine and a motor of the vehicle 10. Upon detecting user manipulation on the activation switch 115, the ECU 110 determines whether or not the prime mover is controlled to activate. The ECU 110 transmits an activation signal to a device under engine control when determined that the prime mover is controlled to activate.

The ECU 110 connects with a horn 181 and a lighting device 182 (a notification unit according to the disclosure) according to a known technology via the in-vehicle LAN 180.

The door 140 of the vehicle 10 includes a door lock control unit 141 (a generic term for 141FR, 141FL, 141RR, and 141RL to be described later) that provides, in response to a control signal from the ECU 110, control to lock or unlock the door and outputs a door lock state (i.e., locked or unlocked) to the ECU 110. The door 140 further includes a door switch 142 (a generic term for 142FR, 142FL, 142RR, and 142RL to be described later and corresponding to a door state detection unit according to the disclosure) that detects an open/close state of the door 140.

A knob (not shown) of at least a driver's seat door 140FR or the vicinity thereof includes a door lock switch 144FR (corresponding to a lock instruction detection unit according to the disclosure) that a user uses to lock or unlock the door. The other doors may include door lock switches (144FL, 144RR, and 144RL).

A trunk hatch 150 includes a trunk lock control unit 151, a trunk switch 152, and a trunk unlock switch 154. The trunk lock control unit 151 provides control to lock or unlock the trunk hatch 150 in response to a control signal from the ECU 110. The trunk switch 152 detects an open/close state of the trunk hatch 150. A user uses the trunk unlock switch 154 to unlock the trunk hatch 150.

The main key 102 and the auxiliary key 103 use the same hardware configuration except a difference in notification information (stored in memory 127 or 137) to identify itself. The following describes the main key 102 as an example.

The main key 102 includes a control unit 120 connecting with an LF reception unit 121, a UHF transmission unit 122, manipulation switches 124 through 126, and memory 127.

The control unit 120 represents a microcomputer including a known CPU, ROM and RAM to store various programs (generically termed a portable device control program), and a signal input/output circuit that are not shown in the drawings. The CPU performs the portable device control program to implement various functions as the main key 102.

The LF reception unit 121 receives a radio signal as an LF-band radio wave transmitted from the in-vehicle device 101. The UHF transmission unit 122 transmits a radio signal as a UHF-band radio wave to the in-vehicle device 101.

The manipulation switches 124 through 126 trigger mainly a remote keyless entry function to be used. When these switches are manipulated, the manipulation switch 124 locks the door 140, the manipulation switch 125 unlocks the door 140, and the manipulation switch 126 only unlocks the trunk hatch 150.

The memory 127 uses a nonvolatile storage medium such as flash memory. The memory 127 stores identification information (corresponding to first identification information according to the disclosure) to identify the main key. Similarly, the memory 137 of the auxiliary key 103 stores second identification information according to the disclosure.

Based on the above-mentioned configuration, the smart entry system 100 controls the LF transmission unit 111 of the in-vehicle device 101 to transmit a signal (such as a response request signal) to the main key 102 from the door antenna 116, the indoor antenna 117, the inside-trunk antenna 118, and the outside-trunk antenna 119 (also generically referred to as an antenna) at a predetermined timing or cycle. The UHF reception unit 112 receives a response signal from the main key 102.

Suppose that the smart entry system 100 correctly receives a signal (such as a response signal corresponding to a response request signal) from the main key 102. The smart entry system 100 verifies identification information contained in the response signal and master information stored in the memory 113. Based on a verification result, the smart entry system 100 locks or unlocks the door 140, controls the prime mover to activate based on manipulation on the activation switch 115, or retries the verification process. These technologies are widely known and do not directly concern the disclosure, and a detailed description is omitted for simplicity.

Figure 2:
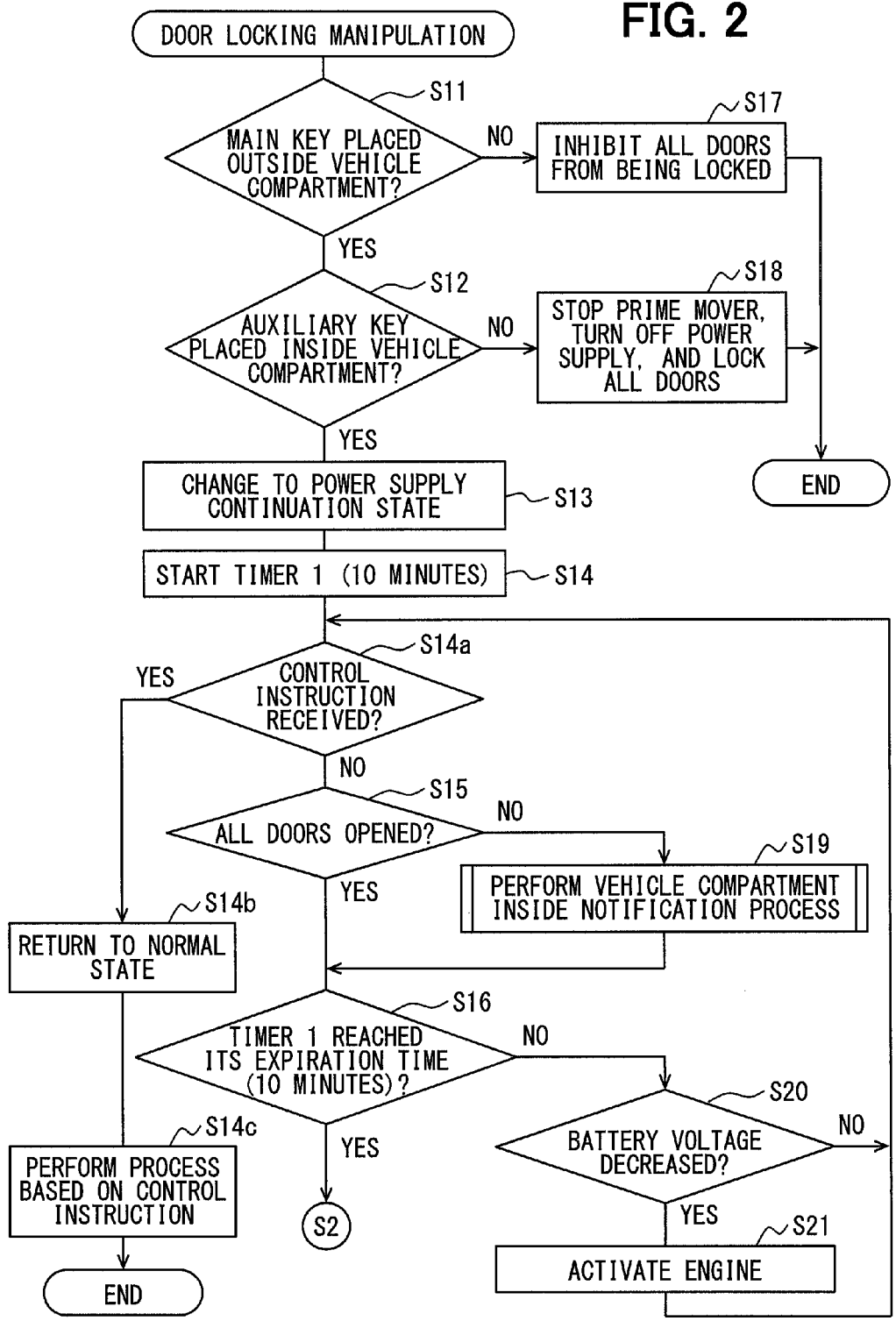
FIG. 2 is a flowchart illustrating a power supply continuation process according to the embodiment.
Figure 3:
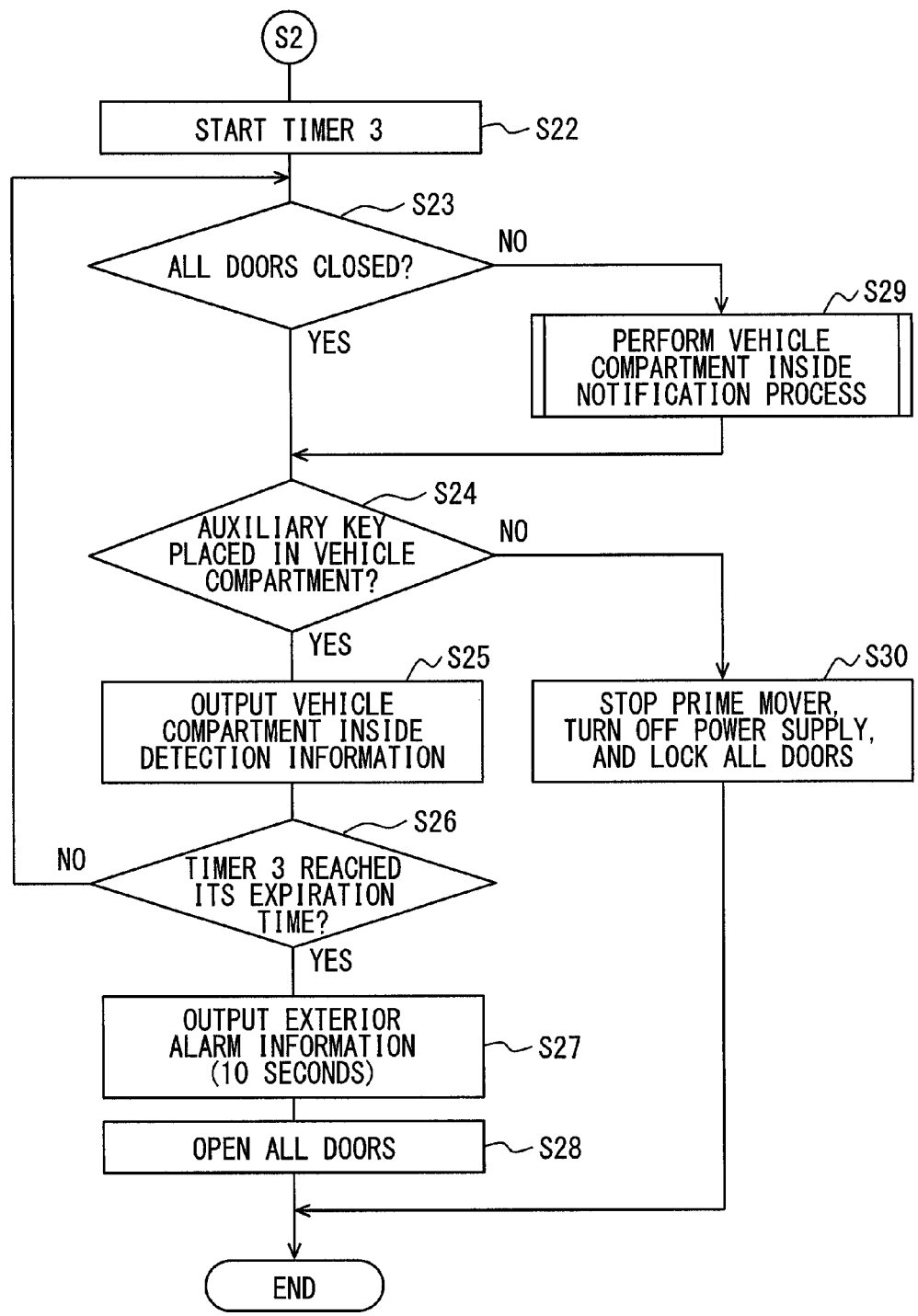
FIG. 3 is a flowchart illustrating the power supply continuation process continued from FIG. 2.

With reference to FIGS. 2 and 3, the following describes a power supply continuation process contained in the in-vehicle device control program for the in-vehicle device 101. The process is performed when the system detects locking manipulation by a user. At least one of the following is assumed to be the locking manipulation.

A user leaves the vehicle and then manipulates a door lock switch 144 (a generic term for 144FR, 144FL, 144RR, and 144RL to be described later) under the condition that the engine stops and all doors are closed.

A reception level to receive a radio wave from the main key 102 decreases and goes below a predetermined threshold value. This signifies that a user carrying the main key 102 gets away from the vehicle 10.

The program determines whether or not the main key 102 is placed outside the vehicle compartment. The program assumes the main key 102 to be placed outside the vehicle compartment when the indoor antenna 117 or the inside-trunk antenna 118 does not detect or verify the main key 102.

When determining that the main key 102 is not placed outside the vehicle compartment (S11: No), the program inhibits all doors from being locked (at S17) and terminates the process. When determining that the main key 102 is placed outside the vehicle compartment (S11: Yes), the program determines whether or not the auxiliary key 103 is placed inside the vehicle compartment. The program assumes the auxiliary key 103 to be placed inside the vehicle compartment when the indoor antenna 117 or the inside-trunk antenna 118 detects and verifies the auxiliary key 103.

The program locks all doors when determining that the auxiliary key 103 is not placed inside the vehicle compartment (S12: No). The program outputs a control signal to the in-vehicle LAN 180 (at S18) to stop the prime mover and stop supplying the power to a vehicle device (or a power supply continuation device) to be continuously supplied with the power. The in-vehicle LAN 180 may be replaced by a power supply control line for the power supply continuation device. The power supply control line may directly provide control to stop supplying the power (or to turn off the power supply continuation device).

According to the configuration at S18, the program locks the door when the lock instruction detection unit detects a lock instruction and the portable device detection unit detects that the first portable device and the second portable device are placed outside the vehicle. The program changes a power supply continuation state to a normal state. The state information output unit outputs state information indicating the normal state. The configuration can determine no occupant to be present in the vehicle compartment because all the portable devices are unavailable in the vehicle compartment. This can eliminate an effort for the user to reconfirm the vehicle state and improve the security.

The power supply continuation device excludes at least a travel-related device needed for the vehicle to travel and a prime mover control-related device to control the prime mover of the vehicle. These devices are represented as reference number 183 in FIG. 1. This configuration can prevent a fellow passenger remaining in the vehicle compartment from inadvertently starting the engine to drive the vehicle.

When the auxiliary key 103 remains in the vehicle compartment (S12: Yes), the program outputs a control signal (or state information) to the in-vehicle LAN 180 and proceeds to the power supply continuation state (at S13). The control signal contains at least one of the following instructions.

Lock all doors.

Stop the prime mover.

Continue to supply the power to the power supply continuation device.

Inhibit a change in the shift position (shift lock).

As described above, the in-vehicle LAN 180 may be replaced by the power supply control line for the power supply continuation device. The power supply control line may directly provide control to continue supplying the power (or to turn on the power supply continuation device).

The program starts a timer 1 (such as a 10-minute timer) (at S14). The program determines whether or not the UHF reception unit 112 receives the control instruction from the main key 102 or the auxiliary key 103 carried by the user outside the vehicle. The UHF transmission unit 132 transmits the control instruction according to user manipulation on the switches 124 through 126 or switches 134 through 136.

When receiving at least the control instruction to lock the door 140 (S14a: Yes), the program outputs a control signal (or state information) to the in-vehicle LAN 180 and returns the power supply continuation state to the normal state (at S14b). The program may output state information that resumes the state before transition to the power supply continuation state. The control signal contains at least one of the following instructions.

Stop the prime mover.

Stop supplying the power to an engine ignition-related device (such as an IG-off state).

Stop supplying the power to the power supply continuation device.

The program performs a process such as locking or unlocking the door 140 based on the received control instruction (at S14c). The program then terminates the process.

According to the configuration at S14a through S14c, the in-vehicle device includes the control instruction acquisition unit (112) that acquires a control instruction output from the portable device based on the user's manipulation on the portable device. In the power supply continuation state, the control unit controls operation of a device associated with the control instruction when the control instruction acquisition unit acquires the control instruction. The configuration can prioritize user manipulation on the portable device even when the IG-on state disables a remote keyless function (to disable reception of a radio signal from the portable device). More specifically, the control instruction reflects a door lock instruction. The configuration can eliminate a user's effort to stop the engine when the door needs to be locked from outside.

When the control instruction is not received (S14*a*: No), the program acquires the state of the door switch 142 and determines whether or not all the doors 140 (including the trunk hatch 150 as needed) are closed. When one of the doors is open (S15: No), the program performs a vehicle compartment inside notification process (at S19, see FIG. 4) and proceeds to S16. When all the doors are open (S15: Yes), the program proceeds to S16.

At S16, the program determines whether or not the timer 1 reaches its expiration time (i.e., ten minutes have elapsed).

When the timer 1 does not reach its expiration time (S16: No), the program acquires battery voltage information via the in-vehicle LAN 180. When the battery voltage is lower than a predetermined threshold value (S20: Yes), the program outputs a control signal to activate an engine to the in-vehicle LAN 180, for example (at S21). In this case, the prime mover is assumed to include the engine. The program then returns to S14*a*. When the battery voltage is higher than a predetermined threshold value (S20: No), the program returns to S14*a*.

The configuration at S20 and S21 includes the battery state acquisition unit (114) to acquire a charge state of a vehicle battery. The control unit outputs an activation control signal to activate the prime mover of the vehicle when the battery charge state is below a predetermined threshold value. This configuration can decrease a load on the battery. The vehicle does not travel because no power is supplied to the travel-related device. An air-conditioner can be operated to maintain an air-conditioning state in the vehicle compartment and ensure the comfort.

When the timer 1 reaches its expiration time (S15: Yes, S2), the program proceeds to the flow in FIG. 3 to activate a timer 3 (such as a 60-second timer) (at S22). The program acquires the state of the door switch 142 and determines whether or not all the doors 140 (including the trunk hatch 150 as needed) are closed. When any one of the doors is open (S23: No), the program performs the vehicle compartment inside notification process (at S29, see FIG. 4) and proceeds to S24. When all the doors are open (S23: Yes), the program proceeds to S24.

At S24, the program determines whether or not the auxiliary key 103 is placed in the vehicle compartment. When the auxiliary key 103 is not placed in the vehicle compartment (S24: No), the program locks all the doors. The program further outputs a control signal to the in-vehicle LAN 180 (at S30). This control signal stops the prime mover and stops supplying the power to a vehicle device (namely, a power supply continuation device) to be continuously supplied with the power.

When the auxiliary key 103 is placed in the vehicle compartment (S24: Yes), the program outputs vehicle compartment inside detection information to the in-vehicle LAN 180 (at S25). The vehicle compartment inside detection information controls the vehicle compartment inside to notify that the timer 1 reaches its expiration time and a user is requested to get out of the vehicle as soon as possible. The program then terminates the process. The vehicle compartment inside detection information may be notified according to any of the following techniques.

Blinking an interior lamp included in the lighting device 182.

Displaying a message on a display unit included in another vehicle device (183).

Using a notification unit such as a buzzer when included in the in-vehicle device 101 (such as the ECU 110).

According to the configuration at S25, the in-vehicle device includes a notification unit to notify the vehicle compartment inside that the time to continue the power supply continuation state exceeds a predetermined threshold value (vehicle compartment inside detection information). This configuration can prompt an occupant staying in the vehicle compartment to leave the vehicle.

The program determines whether or not the timer 3 reaches its expiration time (such as 60 seconds as a predetermined first time). When the timer 3 reaches its expiration time (S26: Yes), the program outputs exterior alarm information to the in-vehicle LAN 180 (at S27). The exterior alarm information alerts the vehicle compartment inside that the timer 3 reaches its expiration time or an occupant stays in the vehicle compartment. The exterior alarm information may be notified according to any of the following techniques.

Lighting or blinking a headlight or a hazard light (e.g., for ten seconds) included in the lighting device 182.

Sounding the horn 181 (e.g., for ten seconds).

According to the configuration at S27, the notification unit sends a notification inside the vehicle compartment and then notifies outside the vehicle compartment that the portable device detection unit detects the second portable device, if any, in the vehicle compartment (through exterior alarm information). More specifically, the door state detection unit detects that all the doors are closed. In addition, the portable device detection unit continuously detects the second portable device in the vehicle compartment over the predetermined time (i.e., the first time). In such a case, the notification unit notifies this condition (through exterior alarm information) outside the vehicle compartment. This configuration can notify an occupant outside the vehicle that another occupant still stays in the vehicle compartment.

The program opens all the doors (at S28). The program then terminates the process.

Figure 4:
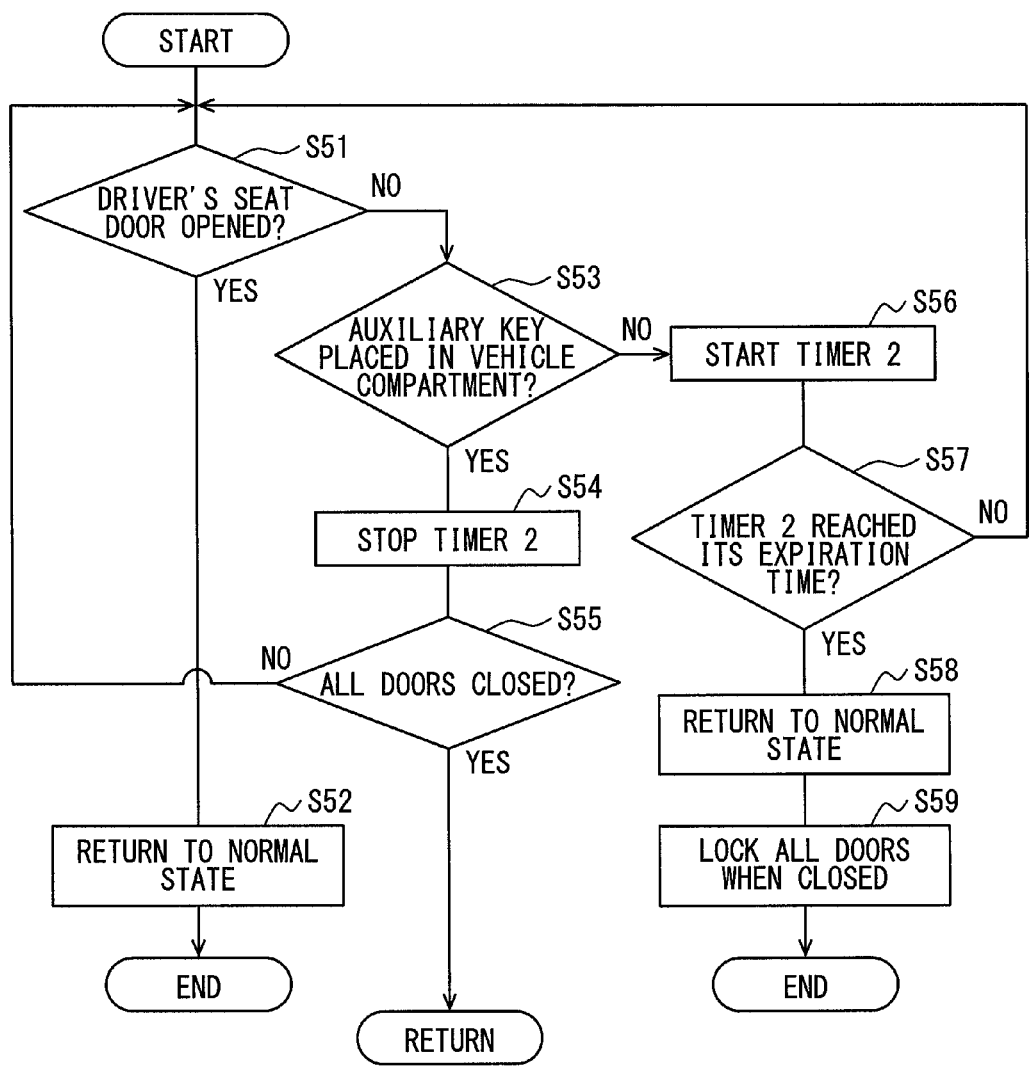
FIG. 4 is a flowchart illustrating a vehicle compartment inside notification process according to the embodiment.

With reference to FIG. 4, the following describes the vehicle compartment inside notification process corresponding to S19 in FIG. 2 and S29 in FIG. 3. The program acquires the state of the door switch 142 and determines whether or not the driver's seat door 140FR is opened. When the driver's seat door 140FR is opened (S51: Yes), the program changes the power supply continuation state to the normal state (at S52) similarly to S14*b* (see FIG. 2). The program then terminates the power supply continuation process without returning to S16 or S24.

According to the configuration at S52, the control unit changes the power supply continuation state to the normal state when a predetermined state release condition is satisfied. The state information output unit outputs state information indicating the normal state. This configuration can allow an occupant outside the vehicle to release the power supply continuation state even when a fellow passenger still stays in the vehicle.

More specifically, the smart entry system 100 includes the door state detection unit (142) to detect a door being opened or closed. The control unit assumes the state release condition to be satisfied when the door state detection unit detects the driver's seat door of the vehicle being opened in the power supply continuation state. This configuration can prioritize a driver's intention to get in the vehicle.

When the driver's seat door 140FR is closed (S51: No), the program determines whether or not the auxiliary key 103 is placed in the vehicle compartment. When the auxiliary key 103 is not placed in the vehicle compartment (S53: No), the program starts the timer 2 when being inactive (at S56). The value of the timer 2 is favorably smaller than the value of the timer 3. This signifies that the second time is set to be shorter than the first time.

When the timer 2 operates, the program determines whether or not the timer 2 reaches its expiration time. When the timer 2 reaches its expiration time (S57: Yes), the program returns the power supply continuation state to the normal state (at S58) similarly to S52. The program locks all the doors 140 when being opened (at S59). The program terminates the power supply continuation process without proceeding to S16 or S24. When the timer 2 does not reach its expiration time (S57: No), the program returns to S51.

According to the configuration at S58, the smart entry system 100 includes the door state detection unit (142) to detect a door being opened or closed. The control unit assumes the state release condition to be satisfied when the door state detection unit detects a door other than the driver's seat door of the vehicle being opened in the power supply continuation state and the portable device detection unit does not continuously detect the first portable device and the second portable device in the vehicle compartment over the predetermined time (i.e., the second time). This configuration periodically verifies the inside of the vehicle compartment in the power supply continuation state to prevent the electric power from being consumed and the amount of battery charge from decreasing.

According to the configuration at S59, the control unit locks a door when the state release condition is satisfied and the door state detection unit detects all the doors being closed. This configuration can determine all occupants to leave the vehicle based on the closed-door state after the state release condition is satisfied. The configuration can eliminate the need for locking manipulation from an occupant (especially a fellow passenger).

When the auxiliary key 103 is placed in the vehicle compartment (S53: Yes), the program stops the timer 2 (at S54). The program acquires the state of the door switch 142 and determines whether or not all the doors are closed. When all the doors 140 are closed (S55: Yes), the program terminates the process and proceeds to S16 or S24. When any one of the doors is opened (S55: No), the program returns to S51.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A smart entry system, comprising:
    a portable device carried by a user;
    an in-vehicle device mounted on a vehicle;
    wherein:
        the portable device includes:
            a main key that stores first identification information to identify the main key itself, and
            an auxiliary key that stores second identification information to identify the auxiliary key itself; and
        the in-vehicle device includes:
            a lock instruction detection unit that detects a lock instruction entered by the user to lock a door of the vehicle,
            a verification unit that verifies that the main key is outside a compartment of the vehicle and that the auxiliary key is inside the compartment of the vehicle in response to the lock instruction detection unit detecting the lock instruction entered by the user to lock the door of the vehicle,
            a portable device detection unit that detects the portable device based on a verification result from the verification unit,
            a control unit that locks the door and changes a state of supplying power to the vehicle from a normal state to a power supply continuation state that continues supplying power to only a predetermined power supply continuation device of the vehicle in response to (i) the lock instruction detection unit detecting the lock instruction and (ii) the verification result received by the portable device detection unit indicating that the main key is outside the compartment of the vehicle and that the auxiliary key is inside the compartment of the vehicle, and
            a state information output unit that outputs state information that reflects the power supply continuation state.

2. The smart entry system according to claim 1, wherein the predetermined power supply continuation device does not include at least a travel-related device needed for traveling of the vehicle and a prime mover control-related device to control a prime mover of the vehicle.

3. The smart entry system according to claim 2, wherein the control unit outputs an instruction signal to stop the prime mover of the vehicle and to stop supplying power to the power supply continuation device when the main key and the auxiliary key are outside of the compartment of the vehicle.

4. The smart entry system according to claim 1,
    wherein the control unit locks the door and changes the power supply continuation state to the normal state in response to (i) the lock instruction detection unit detecting the lock instruction and (ii) the verification result received by the portable device detection unit indicating that the main key and the auxiliary key are outside the compartment of the vehicle, and
    wherein the state information output unit outputs state information that reflects the normal state.

5. The smart entry system according to claim 1, wherein, when a predetermined state release condition is satisfied, the control unit changes the power supply continuation state to the normal state, and the state information output unit outputs state information that reflects the normal state.

6. The smart entry system according to claim 5, further comprising:
    a door state detection unit that detects one of an open state and a close state of the door,
    wherein the control unit determines that the state release condition is satisfied when the door state detection unit detects that a driver's seat door of the vehicle being opened in the power supply continuation state.

7. The smart entry system according to claim 5, further comprising:
    a door state detection unit that detects one of an open state and a close state of the door,
    wherein the control unit determines that the state release condition is satisfied when the door state detection unit detects that a door other than a driver's seat door of the vehicle is open in the power supply continuation state and when the portable device detection unit does not continuously detect the main key and the auxiliary key in the compartment of the vehicle for a predetermined time interval.

8. The smart entry system according to claim 7, wherein the control unit locks the door when the state release condition is satisfied and the door state detection unit detects that all the doors are closed.

9. The smart entry system according to claim 1, further comprising:
a battery state acquisition unit that acquires a charge state of a battery in the vehicle,
wherein the control unit outputs an activation control signal to activate a prime mover of the vehicle when a charge state of the battery falls below a predetermined threshold value.

10. The smart entry system according to claim 1, wherein the in-vehicle device includes a notification unit to notify in the compartment of the vehicle that a duration time of the power supply continuation state exceeds a predetermined threshold value.

11. The smart entry system according to claim 10, wherein, after notification in the compartment, the notification unit notifies outside the compartment of the vehicle that the portable device detection unit detects the auxiliary key in the compartment of the vehicle.

12. The smart entry system according to claim 1,
wherein the in-vehicle device includes a control instruction acquisition unit that acquires a control instruction output from the portable device based on the user's manipulation on the portable device, and
wherein the control unit controls operation of a device as an object of the control instruction when the control instruction acquisition unit acquires the control instruction in the power supply continuation state.

13. The smart entry system according to claim 12, wherein the control instruction reflects an instruction to lock the door.

14. The smart entry system according to claim 1, wherein the control unit inhibits locking of the door when the main key is in the compartment of the vehicle.

15. The smart entry system according to claim 1, wherein the predetermined power supply continuation device includes an audio device, does not include a travel-related device needed for traveling of the vehicle, and does not include a prime mover control-related device to control a prime mover of the vehicle.

\* \* \* \* \*